United States Patent
Cao et al.

(10) Patent No.: US 9,575,530 B2
(45) Date of Patent: Feb. 21, 2017

(54) BOARD, COMMUNICATIONS DEVICE, AND METHOD FOR SUPPLYING POWER FOR BOARD

(71) Applicant: Huawei Technologies Co., Ltd., Shenzhen (CN)

(72) Inventors: Wenzong Cao, Wuhan (CN); Zhe Li, Shenzhen (CN); Pinhua Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 191 days.

(21) Appl. No.: 14/585,617

(22) Filed: Dec. 30, 2014

(65) Prior Publication Data

US 2015/0177807 A1 Jun. 25, 2015

Related U.S. Application Data

(63) Continuation of application No. PCT/CN2014/083314, filed on Jul. 30, 2014.

(30) Foreign Application Priority Data

Dec. 20, 2013 (CN) .......................... 2013 1 0710640

(51) Int. Cl.
*G06F 1/00* (2006.01)
*G06F 1/26* (2006.01)

(52) U.S. Cl.
CPC ..................................... *G06F 1/263* (2013.01)

(58) Field of Classification Search
CPC ....................................................... G06F 1/263
See application file for complete search history.

(56) References Cited

U.S. PATENT DOCUMENTS

| 6,594,771 B1* | 7/2003 | Koerber | .................... G06F 1/26 |
| | | | 713/330 |
| 2004/0010649 A1 | 1/2004 | Weaver et al. | |
| 2014/0350716 A1* | 11/2014 | Fly | ........................ G06F 1/3212 |
| | | | 700/215 |

FOREIGN PATENT DOCUMENTS

| CN | 1472836 A | 2/2004 |
| CN | 201323228 Y | 10/2009 |

(Continued)

OTHER PUBLICATIONS

Partial English Translation and Abstract of Chinese Patent Application No. CN102508541A, Apr. 27, 2015, 7 pages.

(Continued)

*Primary Examiner* — Nitin Patel
(74) *Attorney, Agent, or Firm* — Conley Rose, P.C.

(57) ABSTRACT

A board includes a functional module, and further includes n switch modules, where first ends of the n switch modules are connected to the functional module, and second ends of the n switch modules are connected to n main power interface units respectively, where n is an integer greater than or equal to 2; and a power supply selecting module connected to control ends of the n switch modules, where the power supply selecting module is configured to detect residual power of the n main power interface units, select, from main power interface units with residual power greater than or equal to rated power of the board, a main power interface unit with lowest residual power as a power supply interface unit, and control a switch module connected to the power supply interface unit to be switched on.

13 Claims, 8 Drawing Sheets

(56) References Cited

FOREIGN PATENT DOCUMENTS

| CN | 101727080 A | 6/2010 |
|----|-------------|--------|
| CN | 102103712 A | 6/2011 |
| CN | 102508541 A | 6/2012 |
| CN | 103746442 A | 4/2014 |

OTHER PUBLICATIONS

Partial English Translation and Abstract of Chinese Patent Application No. CN201323228A, Apr. 27, 2015, 10 pages.
Partial English Translation and Abstract of Chinese Patent Application No. CN101727080A, Feb. 28, 2015, 5 pages.
Partial English Translation and Abstract of Chinese Patent Application No. CN102103712A, Feb. 28, 2015, 7 pages.
Partial English Translation and Abstract of Chinese Patent Application No. CN103746442A, Feb. 28, 2015, 2 pages.

* cited by examiner

BOARD, COMMUNICATIONS DEVICE, AND METHOD FOR SUPPLYING POWER FOR BOARD

CROSS-REFERENCE TO RELATED APPLICATIONS

This application is a continuation of International Application No. PCT/CN2014/083314, filed on Jul. 30, 2014, which claims priority to Chinese Patent Application No. 201310710640.7, filed on Dec. 20, 2013, both of which are hereby incorporated by reference in their entireties.

TECHNICAL FIELD

The present invention relates to the field of communications technologies, and in particular, to a board, a communications device, and a method for supplying power for a board.

BACKGROUND

Power is generally supplied for a conventional communications device in two manners, namely, a centralized power supply manner and a fixed partition power supply manner. The centralized power supply manner is to supply power for a whole communications device by using a main power interface unit and a stand-by power interface unit. However, this power supply manner is merely applicable to a scenario in which power consumption of a communications device is relatively low, and if the power consumption of the communications device is relatively large, design of a power interface unit is complex, a size is large, and a cost is high. With an increase in power consumption of a communications device, a fixed partition power supply manner comes into being, where the communications device is divided into multiple different partitions, each partition corresponds to a fixed pair of a main power interface unit and a stand-by power interface unit, each partition may be plugged with multiple boards. However, when a new board is plugged, merely a main power interface unit corresponding to a partition in which the new plugged board is located can be used to supply power for the board. If there are a small number of boards plugged in each partition, in this case, power consumption of a communications device is relatively low, but all power interface units in each partition still need to supply power, which causes a waste of power interface units.

SUMMARY

The present invention provides a board, a communications device, and a method for supplying power for a board. When a new board is plugged, an already used main power interface unit is preferentially selected from multiple main power interface units to supply power, which avoids a waste of power interface units.

To achieve the forgoing beneficial effects, the present invention uses the following technical solutions.

According to a first aspect, the present invention provides a board, including a functional module for implementing a service of the board, and further including n switch modules, where first ends of the n switch modules are all connected to the functional module, and second ends of the n switch modules are connected to n main power interface units respectively, where n is an integer greater than or equal to 2; and a power supply selecting module connected to control ends of the n switch modules, where the power supply selecting module is configured to detect residual power of the n main power interface units, select, from main power interface units with residual power greater than or equal to rated power of the board, a main power interface unit with lowest residual power as a power supply interface unit, and control a switch module connected to the power supply interface unit to be switched on.

With reference to the first aspect, in a first implementation manner of the first aspect, when the n main power interface units are independent from each other, each switch module includes a positive branch switch and a negative branch switch; one end of the positive branch switch is connected to a positive electrode of the main power interface unit, and the other end of the positive branch switch is connected to a positive electrode of the functional module; and one end of the negative branch switch is connected to a negative electrode of the main power interface unit, and the other end of the negative branch switch is connected to a negative electrode of the functional module.

With reference to the first aspect, in a second implementation manner of the first aspect, when the n main power interface units share a positive electrode, each switch module includes a negative branch switch, one end of the negative branch switch is connected to a negative electrode of the main power interface unit, and the other end of the negative electrode branch switch is connected to a negative electrode of the functional module.

With reference to the first aspect, in a third implementation manner of the first aspect, when the n main power interface units share a negative electrode, each switch module includes a positive branch switch, one end of the positive branch switch is connected to a positive electrode of the main power interface unit, and the other end of the positive branch switch is connected to a positive electrode of the functional module.

With reference to the first aspect, or the first, the second, or the third implementation manner of the first aspect, in a fourth implementation manner of the first aspect, the positive branch switch or the negative branch switch includes a first metal-oxide-semiconductor field-effect transistor (MOSFET) and a second MOSFET connected in series, where directions of parasitic diodes of the first MOSFET and the second MOSFET are opposite.

With reference to the first aspect, or the first, the second, or the third implementation manner of the first aspect, in a fifth implementation manner of the first aspect, the positive branch switch or the negative branch switch is a relay.

With reference to the first aspect, or the first, the second, or the third implementation manner of the first aspect, in a sixth implementation manner of the first aspect, the second ends of the n switch modules are further connected to n stand-by power interface units respectively.

With reference to the first aspect, or the first, the second, or the third implementation manner of the first aspect, in a seventh implementation manner of the first aspect, n=2.

According to a second aspect, the present invention provides a communications device, including a backplane, multiple boards, and multiple main power interface units, where multiple board interfaces are disposed on the backplane; each board interface is connected to n main power interface units, where n is an integer greater than or equal to 2; and each board is the foregoing board.

With reference to the second aspect, in a first implementation manner of the second aspect, the communications device further includes multiple stand-by power interface units, where each board interface is further connected to n stand-by power interface units.

With reference to the second aspect or the first implementation manner of the second aspect, in a second implementation manner of the second aspect, n=2.

According to a third aspect, the present invention provides a method for supplying power for a board, including detecting residual power of n main power interface units, and selecting, from main power interface units with residual power greater than or equal to rated power of the board, a main power interface unit with lowest residual power as a power supply interface unit, where n is an integer greater than or equal to 2; and controlling the power supply interface unit to be connected to a functional module in the board.

According to the board, the communications device, and the method for supplying power for a board provided in the present invention, switch modules on each board are connected to multiple main power interface units, and one main power interface unit with highest usage is selected from the multiple main power interface units to supply power, that is, when a new board is plugged, an already used main power interface unit is preferentially selected from the multiple main power interface units to supply power, which avoids a waste of power interface units. In addition, because a main power interface unit may be selected from the multiple main power interface units for a same board, if one main power interface unit is damaged, it may be convenient to switch to another main power interface unit to supply power for the board.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. The described embodiments are merely a part rather than all of the embodiments of the present invention.

Figure 1:
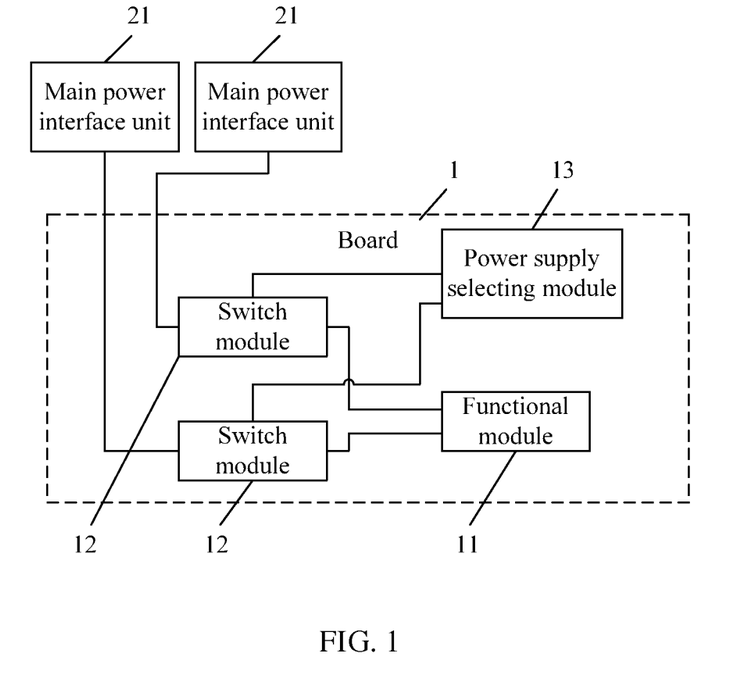
FIG. 1 is a structural block diagram of aboard when the board is connected to main power interface units according to an embodiment of the present invention.

As shown in FIG. 1, an embodiment of the present invention provides a board 1, including a functional module 11 for implementing a service of the board 1, where there may be one or more functional modules 11, for example, including an optical module, a service chip, and the like. The board 1 further includes n switch modules 12, where first ends of the n switch modules 12 are all connected to the functional module 11, and second ends of the n switch modules 12 are connected to n main power interface units 21 respectively, where n is an integer greater than or equal to 2; and the main power interface units 21 are connected to a power supply, and configured to supply power for the board 1; and a power supply selecting module 13, connected to control ends of the n switch modules 12, where the power supply selecting module 13 is configured to detect residual power of the n main power interface units 21, select, from the main power interface units 21 with residual power greater than or equal to rated power of the board 1, a main power interface unit 21 with lowest residual power as a power supply interface unit, and control a switch module 12 connected to the power supply interface unit to be switched on. Residual power of the main power interface unit 21 indicates power that can be provided by the main power interface unit 21 currently. If the main power interface unit 21 is supplying power for another device, the residual power of the main power interface unit 21 is power obtained by subtracting power of the another device from rated power of the main power interface unit; and if the main power interface unit 21 does not supply power for another device, the residual power of the main power interface unit 21 is the rated power of the main power interface unit.

In a whole communications device, each main power interface unit 21 can supply power for multiple boards. After a new board 1 is plugged, the board 1 is connected to the n main power interface units 21, in this case, the n switch modules 12 in the board 1 is in a switched-off state, the functional module 11 is powered off, merely the power supply selecting module 13 is powered on, and power consumption is quite low. The power supply selecting module 13 detects residual power of the n main power interface units 21 connected to the board 1, first determines whether the n main power interface units 21 can meet a rated power requirement of the board 1, if residual power of the n main power interface units 21 is all less than rated power of the board 1, the n switch modules 12 remain switched-off, and the board 1 is powered off; if residual power of a part or all of the main power interface units 21 of the n main power interface units 21 is greater than or equal to the rated power of the board 1, one main power interface unit 21 with lowest power is selected from the n main power interface units 21 as a power supply interface unit, and a switch module 12 connected to the power supply interface unit is controlled to be switched on to enable the functional module 11 to be powered on, a switch module 12 that is not connected to the power supply interface unit remains switched-off, and one main power interface unit 21 with highest usage in the n main power interface units 21 is used to supply power for the board 1.

According to the board in this embodiment, switch modules are connected to multiple main power interface units, and one main power interface unit with highest usage is selected from the multiple main power interface units to supply power, that is, when a new board is plugged, an already used main power interface unit is preferentially selected from the multiple main power interface units to supply power, which avoids a waste of power interface units. In addition, because a main power interface unit may be selected from the multiple main power interface units for a same board, if one main power interface unit is damaged, it may be convenient to switch to another main power interface unit to supply power for the board.

Figure 2:
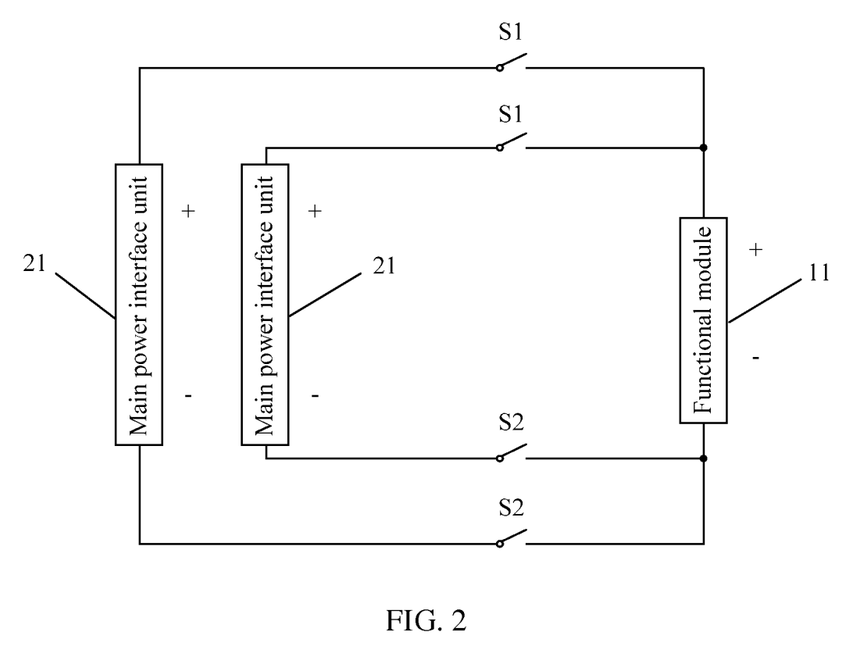
FIG. 2 is a structural block diagram of a switch module when n main power interface units are independent from each other according to an embodiment of the present invention.

Optionally, as shown in FIG. 2, when the n main power interface units 21 are independent from each other, each switch module includes a positive branch switch S1 and a negative branch switch S2; one end of the positive branch switch S1 is connected to a positive electrode of the main power interface unit 21, and the other end of the positive branch switch S1 is connected to a positive electrode of the functional module 11; and one end of the negative branch switch S2 is connected to a negative electrode of the main power interface unit 21, and the other end of the negative branch switch S2 is connected to a negative electrode of the functional module 11. Control ends of the positive branch switch S1 and the negative branch switch S2 are connected to the power supply selecting module (which is not shown in FIG. 2). When a main power interface unit 21 is used as a power supply interface unit to supply power for a board, the power supply selecting module controls the positive branch switch S1 and the negative branch switch S2 that are connected to the power supply interface unit to be switched on, and a positive branch switch S1 and a negative branch switch S2 that are not connected to the power supply interface unit to be switched off. A combining path of positive electrodes of the n main power interface units 21 is connected to the positive electrode of the functional module 11, a combining path of negative electrodes of the n main power interface units 21 is connected to the negative electrode of the functional module 11, and one main power interface unit 21 may supply power for multiple boards; therefore, to ensure that a current of a positive electrode of a main power interface unit 21 flows merely to a negative electrode of the main power interface unit 21, switches need to be disposed in both a positive branch and a negative branch.

Figure 3:
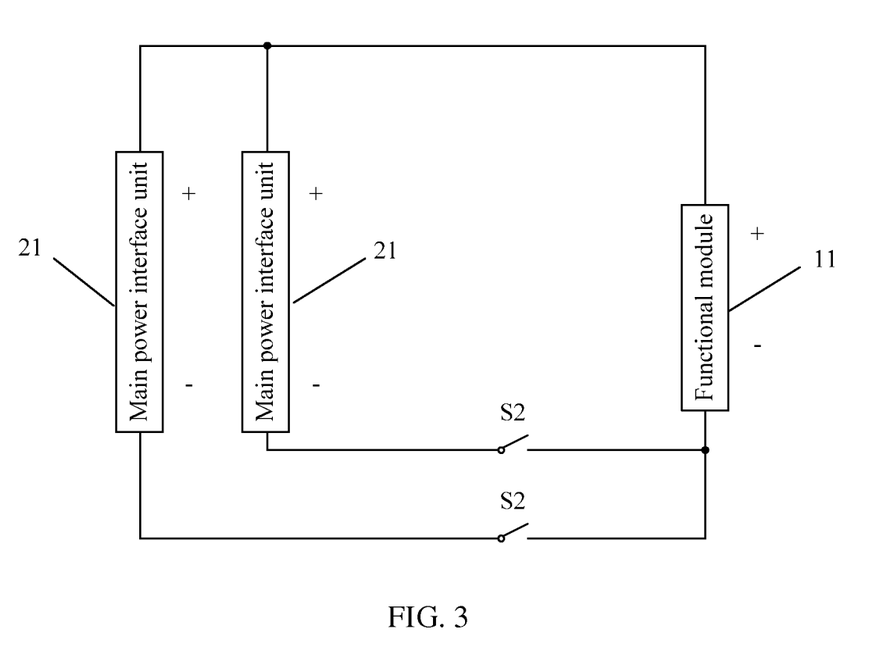
FIG. 3 is a structural block diagram of a switch module when n main power interface units share a positive electrode according to an embodiment of the present invention.

Optionally, as shown in FIG. 3, when the n main power interface units 21 share a positive electrode, each switch module may merely include a negative branch switch S2, one end of the negative branch switch S2 is connected to a negative electrode of the main power interface unit 21, and the other end of the negative branch switch S2 is connected to a negative electrode of the functional module 11.

Figure 4:
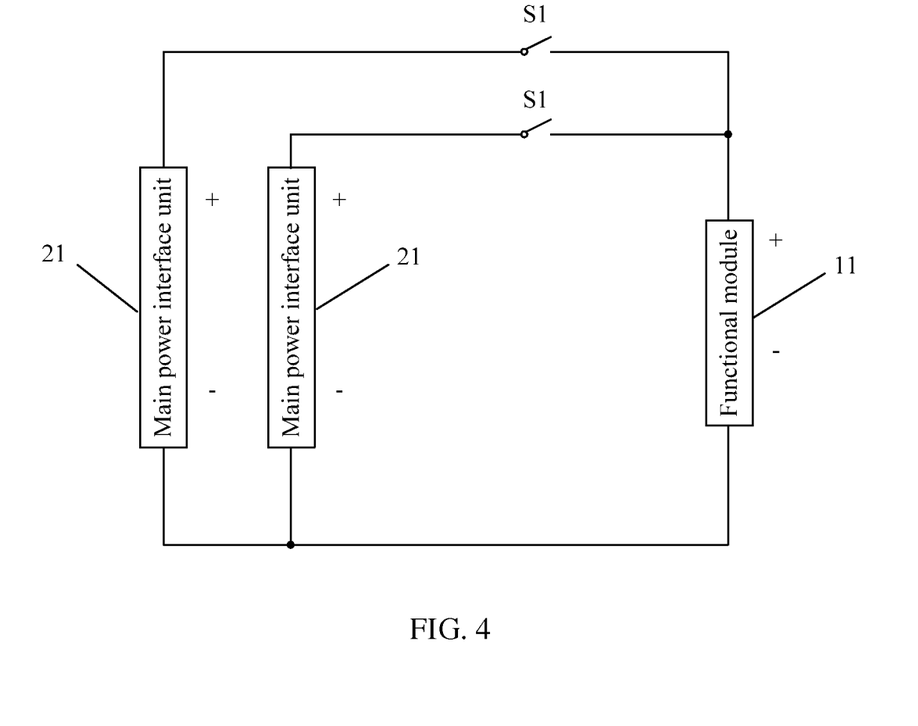
FIG. 4 is a structural block diagram of a switch module when n main power interface units share a negative electrode according to an embodiment of the present invention.

Optionally, as shown in FIG. 4, when the n main power interface units 21 share a negative electrode, each switch module may merely include a positive branch switch S1, one end of the positive branch switch S1 is connected to a positive electrode of the main power interface unit 21, and the other end of the positive branch switch S1 is connected to a positive electrode of the functional module 11.

Figure 5:
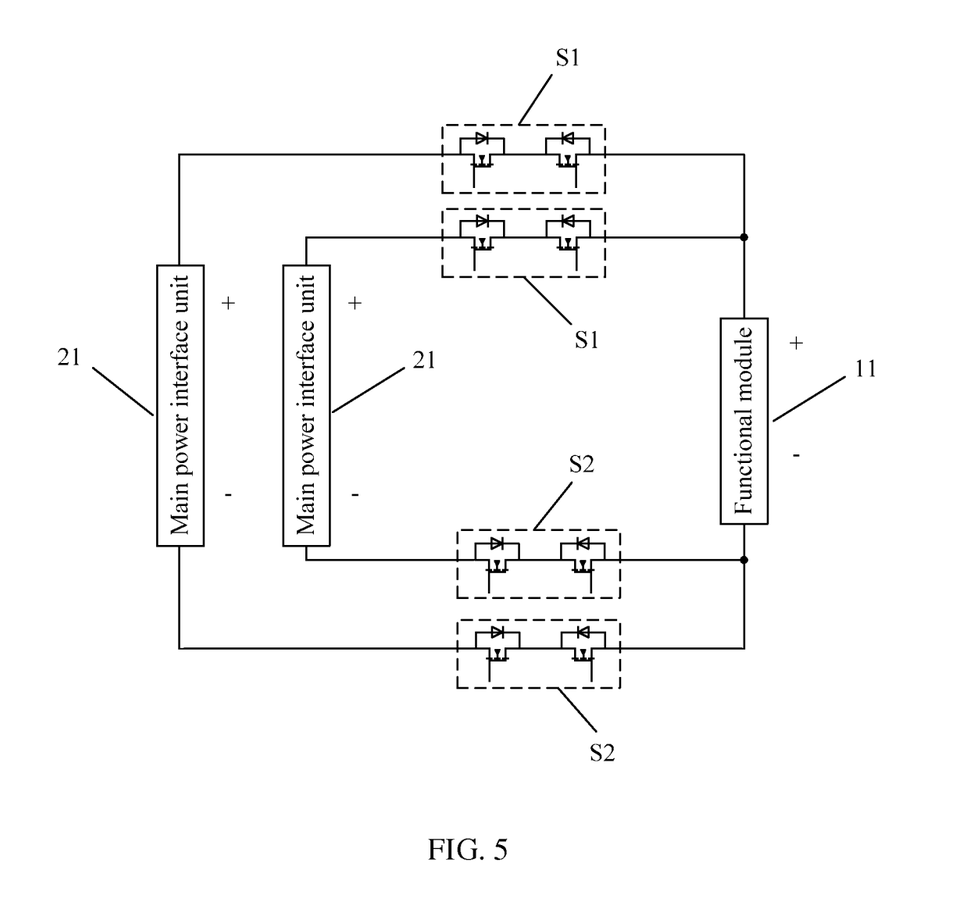
FIG. 5 is a structural block diagram of a switch module including MOSFETs according to an embodiment of the present invention.

A switch component in the switch module may be a MOSFET. As shown in FIG. 5, the positive branch switch S1 or the negative branch switch S2 may include a first MOSFET and a second MOSFET connected in series, where directions of parasitic diodes of the first MOSFET and the second MOSFET are opposite. Because the MOSFETs have anti-parallel parasitic diodes, even if the MOSFETs are switched off, backflow can also occur through the parasitic diodes if there is a reverse current. Because a combining path of multiple main power interface units 21 is connected to a functional module 11 in a board, to avoid that a current of a power supply interface unit flows back to another main power interface unit, two MOSFETs of parasitic diodes with opposite directions are connected in series to avoid a backflow risk.

Optionally, the positive branch switch or the negative branch switch may be a relay, and may also be another controllable switch component definitely.

Figure 6:
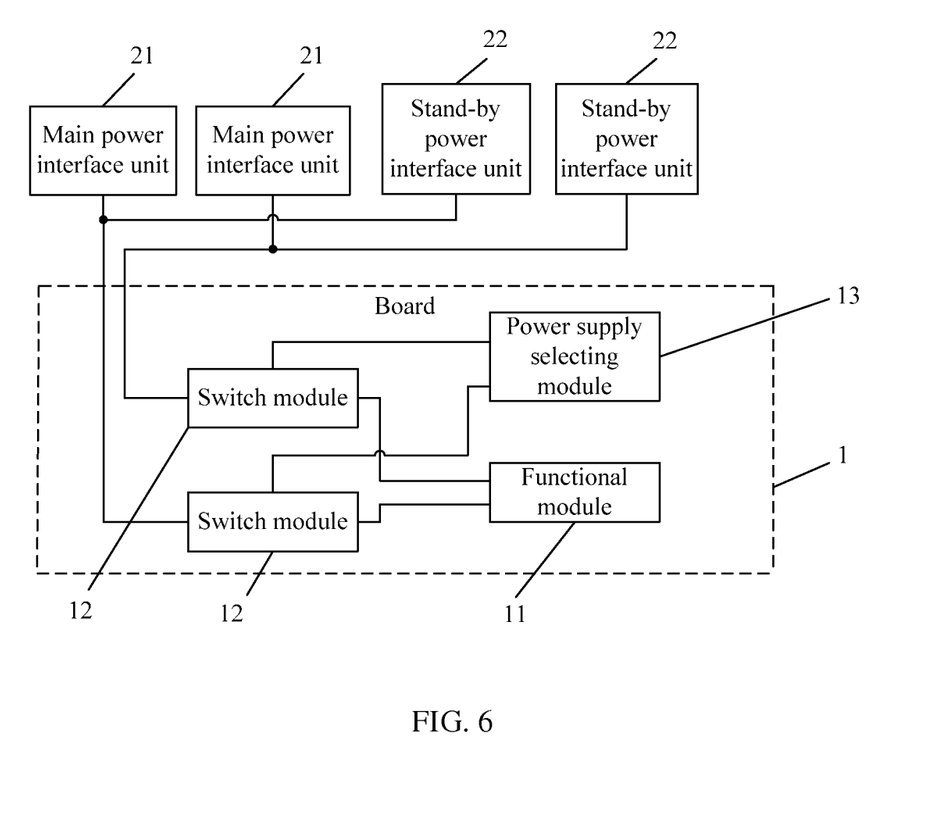
FIG. 6 is a structural block diagram when a board is connected to stand-by power interface units according to an embodiment of the present invention.

As shown in FIG. 6, the second ends of the n switch modules 12 are further connected to n stand-by power interface units 22 respectively, where the n stand-by power interface units 22 correspond to the n main power interface units 21 in a one-to-one manner, and when a main power interface unit 21 cannot be used, a corresponding stand-by power interface unit 22 may be used to supply power.

Optionally, n=2. In this case, structures of a board and a whole communications system are relatively simple and easy to implement.

A specific structure and an operating principle of the board are the same as that in the foregoing embodiment, and details are not repeatedly described herein.

According to the board in this embodiment, switch modules are connected to multiple main power interface units, and one main power interface unit with highest usage is selected from the multiple main power interface units to supply power, that is, when a new board is plugged, an already used main power interface unit is preferentially selected from the multiple main power interface units to supply power, which avoids a waste of power interface units. In addition, because a main power interface unit may be selected from the multiple main power interface units for a same board, if one main power interface unit is damaged, it may be convenient to switch to another main power interface unit to supply power for the board.

Figure 7:
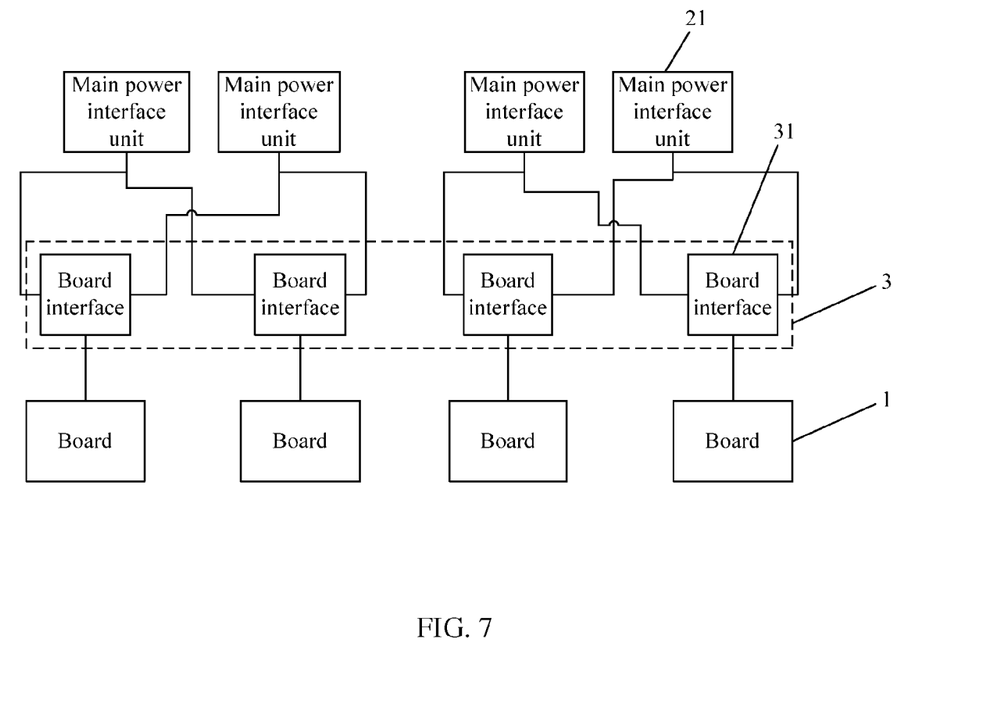
FIG. 7 is a structural block diagram of a communications device according to an embodiment of the present invention.

As shown in FIG. 7, an embodiment of the present invention provides a communications device, including a backplane 3, multiple boards 1, and multiple main power interface units 21, where multiple board interfaces 31 are disposed on the backplane 3; each board interface 31 is connected to n main power interface units 21 of the multiple main power interface units 21, where n is an integer greater than or equal to 2; and each board 1 is the board in the foregoing embodiments. The board 1 may be plugged on the board interface 31 on the backplane 3, and further connected to the n main power interface units 21.

A specific structure and an operating principle of the board 1 are the same as that in the foregoing embodiments, and details are not repeatedly described herein.

According to the communications device in this embodiment, switch modules on each board are connected to multiple main power interface units, and one main power interface unit with highest usage is selected from the multiple main power interface units to supply power, that is, when a new board is plugged, an already used main power interface unit is preferentially selected from the multiple main power interface units to supply power, which avoids a waste of power interface units. In addition, because a main power interface unit may be selected from the multiple main power interface units for a same board, if one main power interface unit is damaged, it may be convenient to switch to another main power interface unit to supply power for the board.

The foregoing communications device may further include multiple stand-by power interface units (which are not shown in FIG. 7), where each board interface is further connected to n stand-by power interface units. Optionally, n=2.

According to the communications device in this embodiment, switch modules on each board are connected to multiple main power interface units, and one main power interface unit with highest usage is selected from the multiple main power interface units to supply power, that is, when a new board is plugged, an already used main power interface unit is preferentially selected from the multiple main power interface units to supply power, which avoids a waste of power interface units. In addition, because a main power interface unit may be selected from the multiple main power interface units for a same board, if one main power interface unit is damaged, it may be convenient to switch to another main power interface unit to supply power for the board.

Figure 8:
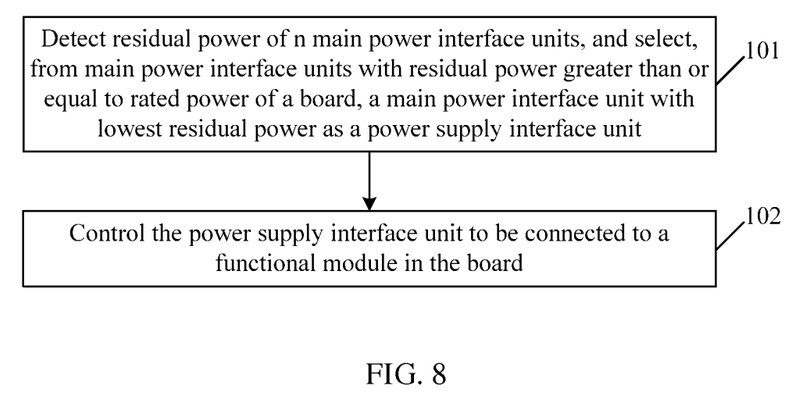
FIG. 8 is a flowchart of a method for supplying power for a board according to an embodiment of the present invention.

As shown in FIG. 8, an embodiment of the present invention provides a method for supplying power for a board, where the method for supplying power for a board may be applied to the foregoing board, and the method for supplying power for a board includes the following steps.

Step 101. Detect residual power of n main power interface units, and select, from main power interface units with residual power greater than or equal to rated power of the board, a main power interface unit with lowest residual power as a power supply interface unit, where n is an integer greater than or equal to 2.

Step 102. Control the power supply interface unit to be connected to a functional module in the board, and further enable the power supply interface unit to supply power for the board.

A specific structure of the board and a specific principle of the method for supplying power for a board are the same as that in the foregoing embodiments, and details are not repeatedly described herein.

According to the method for supplying power for a board in this embodiment, switch modules on each board are connected to multiple main power interface units, and one main power interface unit with highest usage is selected from the multiple main power interface units to supply power, that is, when a new board is plugged, an already used main power interface unit is preferentially selected from the multiple main power interface units to supply power, which avoids a waste of power interface units. In addition, because a main power interface unit may be selected from the multiple main power interface units for a same board, if one main power interface unit is damaged, it may be convenient to switch to another main power interface unit to supply power for the board.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A board, comprising:
   a power consuming load that implements a service of the board;
   n switch modules, wherein first ends of the n switch modules are all connected to the power consuming load, wherein second ends of the n switch modules are connected to n main power interface units respectively, and wherein n is an integer greater than or equal to two; and
   a power supply selector connected to control ends of the n switch modules,
   wherein the power supply selector is configured to:
      detect residual power of the is main power interface units;
      select, from the n main power interlace units with residual power greater than or equal to rated power of the board, a main power interface unit with lowest residual power as a power supply interface unit; and
      control, a switch module connected to the power supply interface unit to be switched from off to on.

2. The board according to claim 1, wherein the n main power interface units are independent from each other, wherein each switch module comprises a positive branch switch and a negative branch switch, wherein one end of the positive branch switch is connected to a positive electrode of the main power interface unit, wherein the other end of the positive branch switch is connected to a positive electrode of the power consuming load, wherein one end of the negative branch switch is connected to a negative electrode of the main power interface unit, and wherein the other end of the negative branch switch is connected to a negative electrode of the power consuming load.

3. The board according to claim 1, wherein the n main power interface units share a positive electrode, wherein each switch module comprises a negative branch switch, wherein one end of the negative branch switch is connected to a negative electrode of the main power interface unit, and wherein the other end of the negative electrode branch switch is connected to a negative electrode of the power consuming load.

4. The board according to claim 1, wherein the n main power interface units share negative electrode, wherein each switch module comprises a positive branch switch, wherein one end of the positive branch switch is connected to a positive electrode of the main power interface unit, and wherein the other end of the positive branch switch is connected to a positive electrode of the power consuming load.

5. The board according to claim 1, wherein the positive branch switch comprises a first metal-oxide-semiconductor field-effect transistor (MOSFET) and a second MOSFET connected in series, and wherein directions of parasitic diodes of the first MOSFET and the second MOSFET are opposite.

6. The board according to claim 1, wherein the negative branch switch comprises a first metal-oxide-semiconductor field-effect transistor (MOSFET) and a second MOSFET connected in series, and wherein directions of parasitic diodes of the first MOSFET and the second MOSFET are opposite.

7. The board according to claim 1, wherein the positive branch switch is a relay.

8. The board according to claim 1, wherein the negative branch switch is a relay.

9. The board according to claim 1, wherein the second ends of the n switch modules are further connected to n stand-by power interface units respectively.

10. The board according to claim 1, wherein n is equal to two.

11. A communications device, comprising:
   a backplane;
   multiple boards; and
   multiple main power interface units,
   wherein multiple board interfaces are disposed on the backplane,
   wherein each board interface is connected to n main power interface units,
   wherein n is an integer greater than or equal to two, and wherein each board comprises:
      a power consuming load that implements a service of the board;
      n switch modules, wherein first ends of the n switch modules are all connected to the power consuming load, wherein second ends of the n switch modules are connected to n main power interface units respectively, and wherein n is an integer greater than or equal to two; and
      a power supply selector connected to control ends of the n switch modules,
   wherein the power supply selector is configured to:
      detect residual power of the n main power interface units;
      select, from the n main power interface units with residual power greater than or equal to rated power of the board, a main power interface unit with lowest residual power as a power supply interface unit; and
      control, a switch module connected to the power supply interface unit to be switched from off to on.

12. The communications device according to claim 11, further comprising multiple stand-by power interface units, and wherein each board interface is farther connected to n stand-by power interface units.

13. The communications device according to claim 11, wherein n is equal to two.

* * * * *

UNITED STATES PATENT AND TRADEMARK OFFICE
CERTIFICATE OF CORRECTION

PATENT NO.        : 9,575,530 B2
APPLICATION NO.   : 14/585617
DATED             : February 21, 2017
INVENTOR(S)       : Wenzong Cao, Zhe Li and Pinhua Zhu

It is certified that error appears in the above-identified patent and that said Letters Patent is hereby corrected as shown below:

In the Claims

Column 8, Line 18, Claim 1 should read:
detect residual power of the n main power interface Column 8, Line 47, Claim 4 should read:
power interface units share a negative electrode, wherein each Signed and Sealed this
Thirtieth Day of May, 2017

Michelle K. Lee
*Director of the United States Patent and Trademark Office*